United States Patent
Diosi et al.

(10) Patent No.: US 7,014,583 B2
(45) Date of Patent: Mar. 21, 2006

(54) CONTINUOUSLY VARIABLE TRANSMISSION

(75) Inventors: Gabor Diosi, Friedrichshafen (DE); Michael Kamm, Bodnegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 274 days.

(21) Appl. No.: 10/447,547

(22) Filed: May 29, 2003

(65) Prior Publication Data

US 2003/0232676 A1    Dec. 18, 2003

(30) Foreign Application Priority Data

Jun. 15, 2002  (DE)  ................. 102 26 861

(51) Int. Cl.
*F16H 63/04*   (2006.01)
*F16H 61/00*   (2006.01)

(52) U.S. Cl. .............. 474/12; 18/46; 18/8; 18/17

(58) Field of Classification Search ............ 474/18, 474/28, 8, 16, 44–49, 37–38
See application file for complete search history.

(56) References Cited

U.S. PATENT DOCUMENTS

| | | | | |
|---|---|---|---|---|
| 3,052,132 A | * | 9/1962 | Erhardt et al. ............. | 474/18 |
| 4,229,988 A | | 10/1980 | Rattunde ............... | 474/28 |
| 4,919,643 A | | 4/1990 | Fuss et al. ............... | 474/46 |
| 5,462,035 A | * | 10/1995 | Teraoka et al. ........... | 474/18 |
| 5,676,612 A | | 10/1997 | Schellekens et al. ........ | 474/18 |
| 6,248,035 B1 | | 6/2001 | Bartlett ................. | 474/13 |
| 6,494,798 B1 | * | 12/2002 | Onogi .................. | 474/28 |
| 6,589,126 B1 | * | 7/2003 | Muller et al. ............ | 474/12 |

FOREIGN PATENT DOCUMENTS

| | | |
|---|---|---|
| DE | 27 44 947 | 3/1980 |
| DE | 38 16 357 C1 | 5/1989 |
| DE | 40 36 722 A1 | 5/1991 |
| DE | 198 82 171 T1 | 2/2000 |
| DE | 696 12 262 T2 | 8/2001 |
| DE | 100 52 471 A1 | 3/2002 |

* cited by examiner

Primary Examiner—Marcus Charles
(74) Attorney, Agent, or Firm—Davis & Bujold, P.L.L.C.

(57) ABSTRACT

The invention concerns a continuously variable belt-drive transmission, especially for motor vehicles. In the pressure less state of the transmission, the axially displaceable cone pulley of the input shaft is loaded with an axial force by a spring system in a manner such that the contact pressure increases on the belt-drive mechanisms and the ratio of the transmission is reduced.

18 Claims, 3 Drawing Sheets

CONTINUOUSLY VARIABLE TRANSMISSION

FIELD OF THE INVENTION

The invention concerns a continuously variable belt-drive transmission, especially for motor vehicles.

BACKGROUND OF THE INVENTION

Such belt-drive transmissions are generally known. Continuously variable belt-drive transmissions usually comprise a variator for ratio adjustment which has a first cone pulley pair upon an input shaft and a second cone pulley pair upon an output shaft, and a belt-drive means running between the cone pulley pairs. Each cone pulley pair consists of one first pulley (a fixed pulley) stationary in an axial direction and one second cone pulley (an adjusting pulley) displaceable in an axial direction. The input shaft of the variator is usually designated as the primary shaft and the first cone pulley pair accordingly as the primary pulley pair. The output shaft of the variator is, as a rule, similarly designated as the secondary shaft and the second cone pulley pair as the secondary pulley pair. The primary pulleys and secondary pulleys and thus the ratio are axially adjusted by a pressure medium. The pressure medium is usually conveyed via ducts onto one or more pressure chambers of the primary or secondary pulley, and a pressure-medium pump making available the oil pressure needed.

The pressure supply of the whole transmission is mostly made possible via a pressure-medium pump directly coupled with the input rotational speed. The volume of oil conveyed depends therefore directly on the input rotational speed. When now the input rotational speed drops down to zero, the transmission is no longer supplied with oil and a so-called pressureless state appears. In this state, the maximum ratio is usually adjusted. At the same time, the primary pulleys stay insofar as possible, apart from each other and the belt-drive means rests on the primary side upon the smallest possible friction radius. The friction radius of the belt-drive means upon the output shaft, which radius is preset by the secondary pulleys, is thus at a maximum. When the motor vehicle now has to be towed in this condition, serious problems can arise:

The drive wheels of the vehicle guide torque into the transmission which is in the pressureless state. The torque is transmitted to the drive wheel via the output shaft and the belt-drive means. In the pressureless state, since a minimum friction radius adjusts on the input side and a maximum friction radius accordingly on the output side, the input shaft has to accelerate very intensively. In the pressureless state, since the compression force of the cone pulleys on the primary side is minimal, a skidding of the belt-drive means upon the primary pulleys can occur under the intensive acceleration whereby the primary pulleys are seriously damaged.

Due to the skidding, it can also occur that one clutch connected with the input shaft is intensively accelerated even when the vehicle motor is idle. When a certain limit rotational speed is exceeded, an undesired engaging of the clutch can occur in the clutch arrangement due to the rotational pressure then appearing. Due to the trailing torque then prevailing, an overheating of the clutch and the damage thereof can result.

SUMMARY OF THE INVENTION

According to the invention, the aforementioned problems are solved by the fact that the load piston of the adjusting pulley of the input shaft is loaded with spring tension via a spring device whereby, when the transmission is in the pressureless state, the adjusting pulley is axially displaced in a direction toward the fixed pulley. The applied pressure of the cone pulleys thereby increases upon the belt-drive means, preventing a skidding of the belt-drive means during towing. In addition, the primary pulleys move in the axial direction on top of each other whereby the friction radius of the belt-drive means upon the primary pulleys increases and the ratio diminishes. The spring tension acts here only during the pressureless state of the transmission and, therefore, does not affect regulation of the variator during normal driving operation. Besides, the number of operating strokes of the spring device minimizes and this acts positively upon the service life thereof.

A first advantageous embodiment is implemented by at least one plate spring mounted outside a first pressure chamber of a contact pressure device of the adjusting pulley of the primary side. The plate spring braces a first load piston with a shaft-tied cylinder and is advantageously centered on a cylindrical part of the first load piston. Thereby the load piston, in the pressureless state, is axially pressed away from the cylinder to the fixed pulley. The adjusting pulley thus moves and increases the contact pressure upon the belt-drive means and, likewise, the friction radius of the belt-drive means.

One other advantageous embodiment contains a second plate spring which, the same as the first plate spring, is centered on a cylindrical part of the load piston. The second plate spring braces itself between the first plate spring and the cylinder. The first plate spring braces itself between the second plate spring and the outer side of the load piston. The spring tension upon the load piston and also the spring travel are increased without great expense by the second plate spring.

In both embodiments, in further advantageous arrangements, the first, the same as the second plate springs, can be centered on their radially inner side.

A circlip can be installed, as needed, so as to make a stoke limitation of the plate spring possible by simple means. With the stroke limitation, the travel of the plate spring can be adapted to different designs of variators. Besides, the service life of the plate spring can be substantially improved by the limitation of the stroke.

In the pressurized state of the transmission, the plate spring is permanently kept at its maximum engaged state. Thus, it does not affect the regulation of the variator during normal driving operation. Besides, the number of operating strokes of the spring is thereby reduced, which has a positive effect on the service life thereof.

BRIEF DESCRIPTION OF THE DRAWING

The invention will now be described, by way of example, with reference to the accompanying drawings in which.

DETAILED DESCRIPTION OF THE INVENTION

Figure 1:
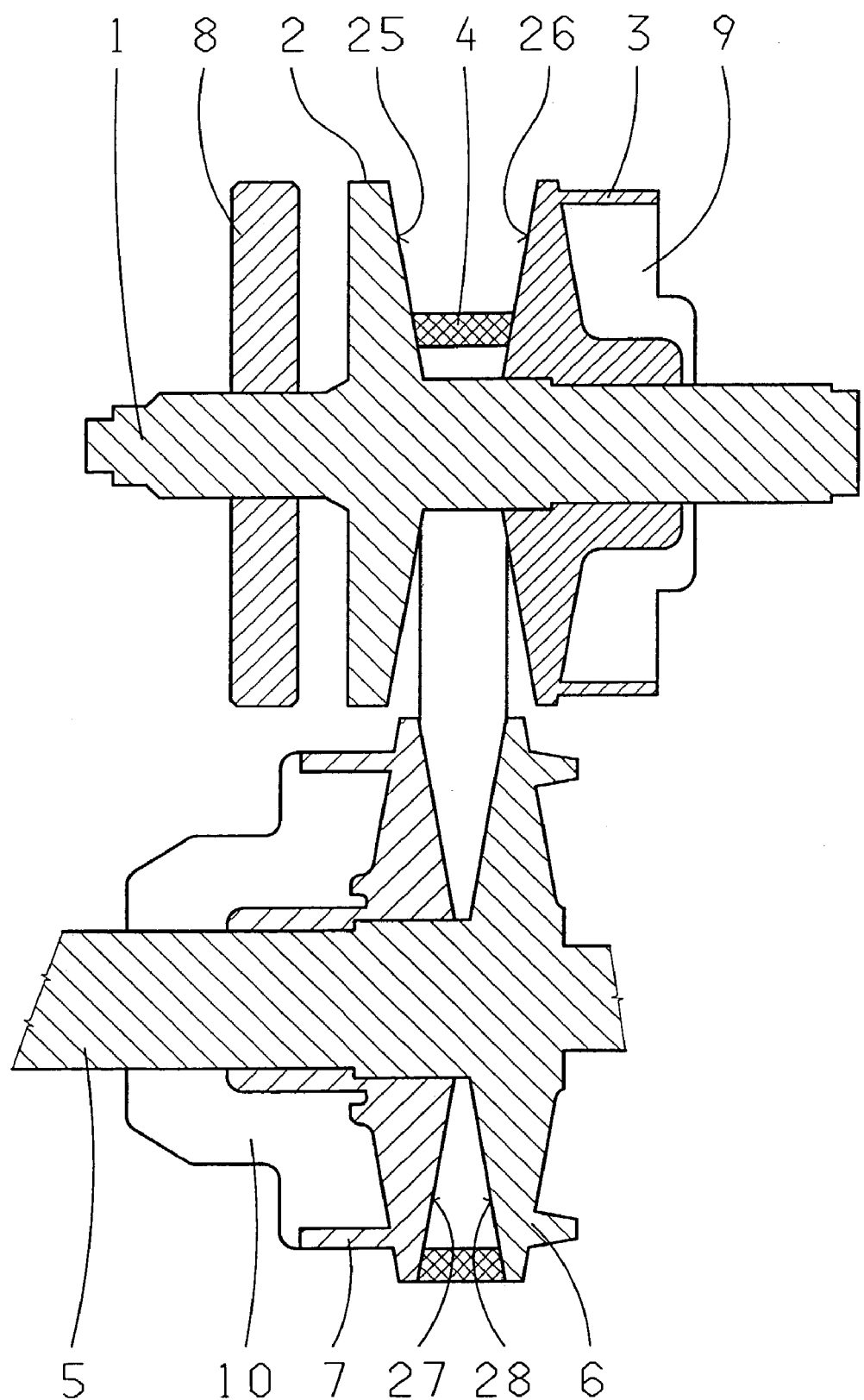
FIG. 1 show parts essential to the invention of a continuously variable belt-drive transmission.

FIG. 1 shows a view of the parts essential to the invention of a continuous belt-drive transmission. One first input shaft 1 carries the primary pulleys 2, 3 which are designed with tapered friction surfaces 25, 26. One of the pulleys is designed as fixed pulley 2 fixedly supported on the shaft and one as an axially movable adjusting pulley 3. Between the primary pulleys 2, 3 lies a belt-drive means 4 which, during the driving operation, transmits torque from the input shaft 1 to the output shaft 5. Upon the output shaft 5 are supported secondary pulleys 6, 7 which are also designed with tapered friction surfaces. A first clutch 8 is fixedly connected with the input shaft 1. The contact pressure devices 9, 10, next to the adjusting pulleys, are diagrammatically shown.

Figure 2:
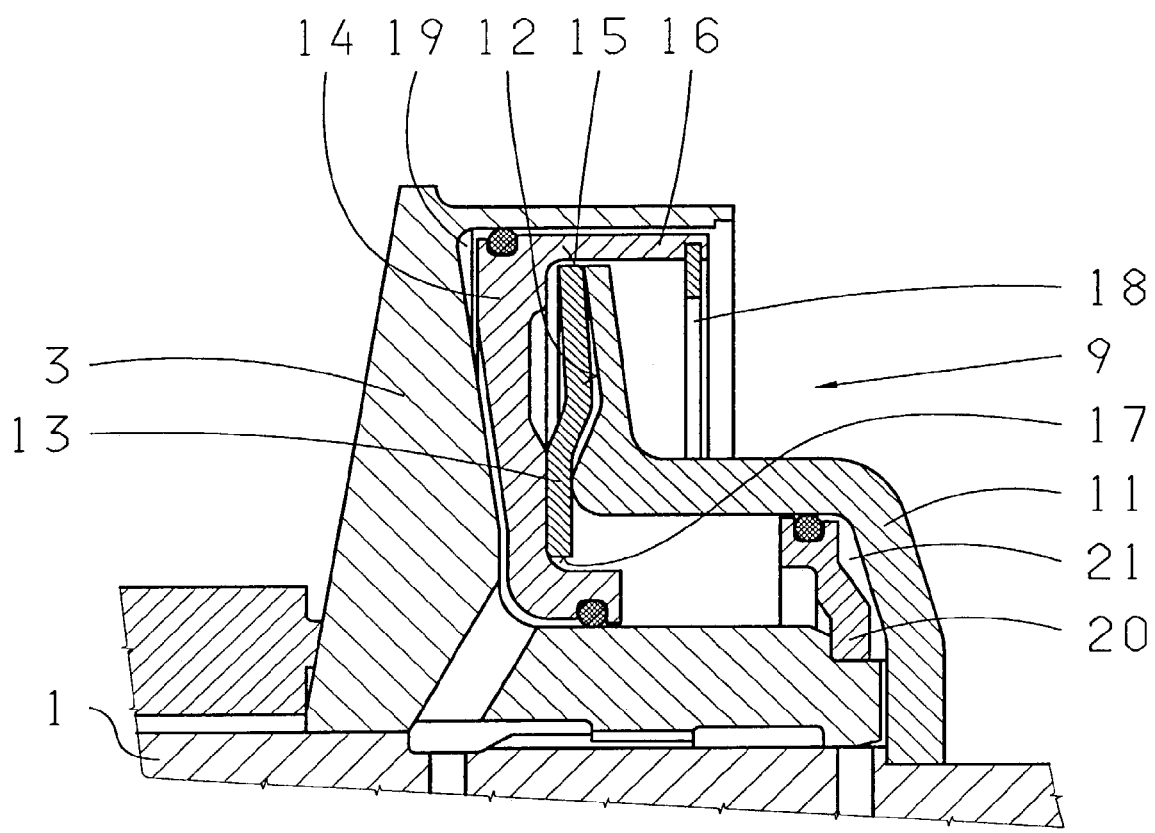
FIG. 2 shows a first spring arrangement.

FIG. 2 shows a detailed view of an advantageous arrangement. Upon the input shaft 1 sits an axially movable cone pulley, the so-called adjusting pulley 3. In addition, a shaft-tied cylinder 11 is fastened upon the input shaft 1. On the side of the cylinder 12 facing the adjusting pulley 2, a plate spring 13 is pressed against a first load piston 14. The plate spring 13 is centered at its radially outer side 15 by a cylindrical part of a load piston 16 and, in addition, it presses with a radially outer edge 15 against the shaft-tied cylinder 11. The plate spring 13 presses with its radially inner edge 17 against the load piston 14. A circlip 18 is inserted in the cylindrical part of the load piston 16. The circlip 18 serves as stroke limit for the plate spring 13 so that, in a pressureless state of the transmission, a ratio of the transmission remains greater than one (iV>1). The spring stroke can thereby be adapted by simple means to the total ratio of the transmission. The first load piston 14 with the adjusting pulley 3 form a first pressure chamber 19. The cylinder 11 with a second load piston 20 and the input shaft 1 form a second pressure chamber 21.

In one other advantageous embodiment, the plate spring 13 can also be centered at its radially inner side 17.

In another advantageous embodiment, the plate spring 13 can also be inversely built by pressing with its radially inner side 17 against the cylinder 11 and with the radially outer side against the load piston 14. At the same time, the pressure surface of the shaft-tied cylinder 12 is advantageously elongated inwardly in a radial direction.

Figure 3:
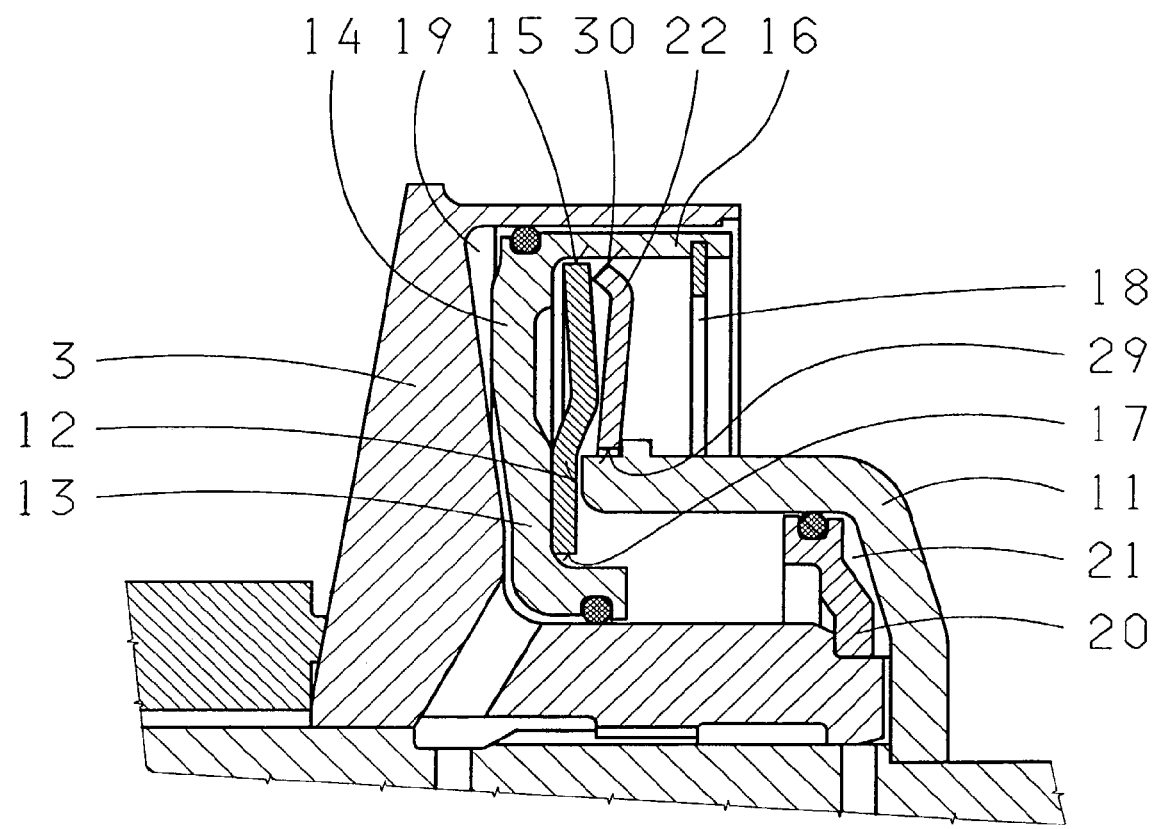
FIG. 3 shows a second spring arrangement.

FIG. 3 shows another advantageous embodiment of the invention. A second plate spring 22, the same as the first plate spring 13, is centered in a cylindrical part of a load piston 16. Said second plate spring 22 braces itself between the first plate spring 13 and the shaft-tied cylinder 11, pressing against the first plate spring 13 with its radially outer edge 30 and against the shaft-tied cylinder 11 with its radially inner edge 29. The first plate spring 13 braces itself between the second plate spring 22 and the load piston 14. By its radially inner edge 17 it presses against the load piston 14 and by its radially outer edge 15 against the second plate spring 22. By said second plate spring 22, the spring tension upon the load piston 14 and also the spring stroke can be increased without great expense.

In this embodiment the first plate spring 13 can be inversely installed in which case its radially inner side 17 presses against a second plate spring 22 and its radially outer side 15 presses against the load piston 14. For this purpose the second plate spring 22 is advantageously applied to the radially inner side 29 of the shaft-tied cylinder 11.

In this embodiment, the plate spring 13 can also be centered, in another design, on its radially inner side.

REFERENCE NUMERALS

| | |
|---|---|
| 1 input shaft | 17 radially inner end of the plate spring |
| 2 fixed pulley | 18 circlip |
| 3 adjusting pulley | 19 pressure chamber |
| 4 belt-drive means | 20 load piston |
| 5 output shaft | 21 pressure chamber |
| 6 fixed pulley | 22 plate spring |
| 7 adjusting pulley | 23 outer edge |
| 8 clutch | 24 inner edge |
| 9 contact pressure device | 25 tapered face |
| 10 contact pressure device | 26 tapered face |
| 11 cylinder | 27 tapered face |
| 12 pressure face of the cylinder | 28 tapered face |
| 13 plate spring | 29 inner edge |
| 14 load piston | 30 outer edge |
| 15 radially outer end of the plate spring | |
| 16 cylindrical part of the load piston | |

The invention claimed is:

1. A continuously variable belt-drive transmission for a motor vehicle, in which a belt-drive (4) runs between primary and secondary pairs of cone pulleys (2, 3, 6, 7) with the primary pair of cone pulleys (2, 3) mounted on an input shaft (1) and the secondary pair of cone pulleys (6, 7) mount on an output shaft (5), and one pulley of each of the primary and secondary pairs of cone pulleys (2,3,6, 7) being a fixed pulley (2, 6) and the other pulley being an axially displaceable adjusting pulley (3, 7), each pulley having tapered friction surfaces (25 to 28), and a first contact pressure device (9) being provided for axial displacement of the primary adjusting pulley (3), and a second contact pressure device (10) being provided for axial displacement of the secondary adjusting pulley (7);

wherein a first pressure chamber (19) is defined between the primary adjusting pulley (3) and a first load piston (14), and during a pressureless state of the transmission, the primary contact pressure device (9) ensures, via a plate spring (13) located outside of the first pressure chamber (19), a contact pressure upon the primary adjusting pulley (3) of the input shaft (1), and the plate spring (13), during an engaged state thereof, braces the first load piston (14) with a shaft-tied cylinder (11).

2. The continuously variable belt-drive transmission according to claim 1, wherein the plate spring (13), via a radially outer edge (15) thereof, loads the shaft-tied cylinder (11) with an axial force counter to a direction of the fixed pulley (2) and the plate spring (13) is centered by its outer edge (15) in a cylindrical part of a load piston (16).

3. The continuously variable belt-drive transmission according to claim 1, wherein a radially inner edge (17) of the plate spring (13) provides an axial force to a load piston (14) biasing the load piston (14) in a direction toward the adjusting pulley (3).

4. The continuously variable belt-drive transmission according to claim 1, wherein during the pressurized state of the transmission, the plate spring (13) is permanently kept at in a maximum engaged state.

5. The continuously variable belt-drive transmission according to claim 1, wherein the first contact pressure device (9) of the primary adjusting pulley (3) of the primary pair of cone pulleys (2, 3) has at least one second pressure chamber (21).

6. The continuously variable belt-drive transmission according to claim 1, wherein at least one radially inner seal is provided on a radially inner surface of the first load piston

(14) and at least one radially outer seal is provided on a radially outer surface of the first load piston (14).

7. The continuously variable belt-drive transmission according to claim 1, wherein a radially inner edge of the plate spring (13) braces against, during the engaged state, the first load piston (14) while a radially outer edge of the plate spring (13) braces against, during the engaged state, the shaft-tied cylinder (11).

8. The continuously variable belt-drive transmission according to claim 1, wherein a radially inner edge (17) of the plate spring (13) provides an axial force to a load piston (14).

9. A continuously variable belt-drive transmission for a motor vehicle having a belt-drive (4) running between primary and secondary pairs of cone pulleys (2, 3, 6, 7) with the primary pair of cone pulleys (2, 3) mounted on an input shaft (1) and the secondary pair of cone pulleys (6, 7) mount on an output shaft (5), and one pulley of each of the primary and secondary pairs of cone pulleys (2, 3, 6, 7) being a fixed pulley (2, 6) and the other pulley being an axially displaceable adjusting pulley (3, 7), each pulley having tapered friction surfaces (25 to 28), and a first contact pressure device (9) being provided for axial displacement of the primary adjusting pulley (3), and a second contact pressure device (10) being provided for axial displacement of the secondary adjusting pulley (7);
  wherein during a pressureless state of the transmission, the primary contact pressure device (9) ensures, via a plate spring (13) located outside a first pressure chamber 19 for the axially displaceable adjusting pulley (3) of the primary pair of cone pulleys (2, 3), a contact pressure upon the primary adjusting pulley (3) of the input shaft (1), and the plate spring (13)), during an engaged state thereof, braces a first load piston (14) with a shaft-tied cylinder (11); and
  a circlip (18) limits a stroke of the plate spring (13) so that, in the pressureless state of the transmission (iV), a ratio of the transmission remains greater than one (iV>1).

10. The continuously variable belt-drive transmission according to claim 9, wherein the plate spring (13), via a radially outer edge (15) thereof, is centered in a cylindrical part of a load piston (16) and loads the shaft-tied cylinder (11) with an axial force directed away from the fixed pulley (2).

11. The continuously variable belt-drive transmission according to claim 9, wherein at least one radially inner seal is provided on a radially inner surface of the first load piston (14) and at least one radially outer seal is provided on a radially outer surface of the first load piston (14).

12. The continuously variable belt-drive transmission according to claim 9, wherein the first contact pressure device (9) of the primary adjusting pulley (3) of the primary pair of cone pulleys (2, 3) has a second pressure chamber (21).

13. The continuously variable belt-drive transmission according to claim 12, wherein the second pressure chamber (21) has a seal which seals against the shaft-tied cylinder (11).

14. The continuously variable belt-drive transmission according to claim 9, wherein a radially inner edge of the plate spring (13) braces against, during the engaged state, the first load piston (14) while a radially outer edge of the plate spring (13) braces against, during the engaged state, the shaft-tied cylinder (11).

15. A continuously variable belt-drive transmission for a motor vehicle having a belt-drive (4) running between primary and secondary pairs of cone pulley (2, 3, 6, 7) with the primary pair of cone pulleys (2, 3) mounted on an input shaft (1) and the secondary pair of cone pulleys (6, 7) mount on an output shaft (5), and one pulley of each of the primary and secondary pairs of cone pulleys (2, 3, 6, 7) being a fixed pulley (2, 6) and the other pulley being an axially displaceable adjusting pulley (3, 7), each pulley having tapered friction surfaces (25 to 28), and a first contact pressure device (9) being provided for axial displacement of the primary adjusting pulley (3), and a second contact pressure device (10) being provided for axial displacement of the secondary adjusting pulley (7);
  wherein during a pressureless state of the transmission, the primary contact pressure device (9) ensures, via a plate spring (13) located outside a first pressure chamber (19), a contact pressure upon the primary adjusting pulley (3) of the input shaft (1), and the plate spring (13)), during an engaged state thereof, braces a first load piston (14) with a shaft-tied cylinder (11); and
  the transmission includes a second plate spring (22) and the second plate spring (22) is centered by a cylindrical part of a load piston (16) and, via a radially outer edge (30) thereof, introduces an axially biasing force on the first plate spring (13) in a direction toward the load piston (14) and introduces, via a radially inner edge (29) thereof, a counterforce toward the shaft-tied cylinder (11).

16. The continuously variable belt-drive transmission according to claim 15, wherein at least one radially inner seal is provided on a radially inner surface of the first load piston (14) and at least one radially outer seal is provided on a radially outer surface of the first load piston (14).

17. The continuously variable belt-drive transmission according to claim 15, wherein the first contact pressure device (9) of the primary adjusting pulley (3) of the primary pair of cone pulleys (2, 3) has at least one second pressure chamber (21).

18. The continuously variable belt-drive transmission according to claim 17, wherein the second pressure chamber (21) has a seal which seals against the shaft-tied cylinder (11).

* * * * *